US012667869B2

(12) United States Patent
Wichman et al.

(10) Patent No.: US 12,667,869 B2
(45) Date of Patent: Jun. 30, 2026

(54) AUTOMATED PRE-WELD TUBE CLEANING USING LASER ABLATION

(71) Applicant: Lockheed Martin Corporation, Bethesda, MD (US)

(72) Inventors: Cameron Alexander Wichman, Fort Worth, TX (US); David Haynes Coleman, Fort Worth, TX (US); Jeffrey P. Langevin, Fort Worth, TX (US); Ethan Louis Torres, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 672 days.

(21) Appl. No.: 18/311,390

(22) Filed: May 3, 2023

(65) Prior Publication Data

US 2024/0367204 A1 Nov. 7, 2024

(51) Int. Cl.

| | |
|---|---|
| ***B08B 9/02*** | (2006.01) |
| ***B08B 7/00*** | (2006.01) |
| ***B08B 9/027*** | (2006.01) |
| ***B08B 13/00*** | (2006.01) |

(52) U.S. Cl.

CPC ............ *B08B 9/021* (2013.01); *B08B 7/0042* (2013.01); *B08B 9/027* (2013.01); *B08B 13/00* (2013.01)

(58) Field of Classification Search

CPC ......... B08B 9/021; B08B 9/023; B08B 9/027; B08B 13/00; B08B 7/0042

See application file for complete search history.

(56) References Cited

U.S. PATENT DOCUMENTS

| | | | | |
|---|---|---|---|---|
| 4,920,994 | A | 5/1990 | Nachbar | |
| 5,157,802 | A * | 10/1992 | Guidry | B08B 9/021 15/104.095 |
| 5,256,848 | A | 10/1993 | Cartry et al. | |
| 6,368,554 | B1 | 4/2002 | Wajsfelner et al. | |
| 6,437,285 | B1 | 8/2002 | Thomas et al. | |
| 11,141,775 | B2 | 10/2021 | Konopacki | |
| 11,440,062 | B2 * | 9/2022 | Ferry | B08B 7/0042 |
| 2011/0049114 | A1 | 3/2011 | Barkhausen et al. | |
| 2014/0353295 | A1 | 12/2014 | Claerhout | |

(Continued)

FOREIGN PATENT DOCUMENTS

| | | | |
|---|---|---|---|
| CN | 110813934 | A | 2/2020 |
| CN | 110976437 | A | 4/2020 |

(Continued)

*Primary Examiner* — Michael L Sehn

(74) *Attorney, Agent, or Firm* — Baker Botts L.L.P.

(57) ABSTRACT

A system includes a laser drive assembly and a computer system. The laser drive assembly includes a laser that emits a laser beam to clean an end of a tube, a first motor that changes an angle of the laser beam with respect to the end of the tube, a second motor that moves the laser laterally, and a third motor that rotates the laser drive assembly around the end of the tube. The computer system is configured to clean the end of the tube by operating the laser to emit the laser beam, adjusting the angle of the laser beam with respect to the end of the tube by operating the first motor, adjusting the distance between the laser and the end of the tube by operating the second motor, and rotating the laser drive assembly around the end of the tube by operating the third motor.

20 Claims, 13 Drawing Sheets

(56) References Cited

U.S. PATENT DOCUMENTS

| | | | |
|---|---|---|---|
| 2018/0369879 | A1 | 12/2018 | Coleman et al. |
| 2021/0138516 | A1 | 5/2021 | Ferry et al. |

FOREIGN PATENT DOCUMENTS

| | | | |
|---|---|---|---|
| CN | 112453710 | A | 3/2021 |
| CN | 214921394 | U | 11/2021 |
| EP | 1992424 | A1 | 11/2008 |
| EP | 2959488 | B1 | 12/2015 |
| WO | 9008005 | | 7/1990 |
| WO | 2012003914 | A1 | 1/2012 |

* cited by examiner

AUTOMATED PRE-WELD TUBE CLEANING USING LASER ABLATION

TECHNICAL FIELD

This disclosure relates in general to laser ablation, and more particularly to automated pre-weld tube cleaning using laser ablation.

BACKGROUND

Metal tubes are used in many different vehicles and applications. As one example, metal tubes made of aluminum or titanium are used in aircraft to carry fuel, hydraulic fluid, and electrical cables. Metal tubes are often required to be welded together. In order to ensure proper welds, surface impurities must be removed from the areas where tubes are to be welded. Typically, the weld areas of tubes are often subjected to chemical treatments to remove impurities prior to welding.

SUMMARY OF THE DISCLOSURE

According to one embodiment, an automated pre-weld tube cleaning system includes a laser drive assembly, a tube centering assembly, a tube support assembly, and a computer system. The laser drive assembly includes an angular member, a carriage plate slidably coupled to the angular member, and a laser coupled to the carriage plate. The laser is configured to emit a laser beam to clean an end of a tube. The laser drive assembly further includes a first motor configured to move the carriage plate and laser along the angular member, thereby changing an angle of the laser beam with respect to the end of the tube. The laser drive assembly further includes a second motor configured to move the laser laterally, thereby changing a distance between the laser and the end of the tube. The laser drive assembly further includes a third motor configured to rotate the laser drive assembly around the end of the tube. The tube centering assembly includes an iris clamp configured to orient the tube. The tube support assembly is configured to grasp the tube at a position below the iris clamp. The computer system is communicatively coupled to the first motor, the second motor, the third motor, and the laser. The computer system is configured to clean the end of the tube by operating the laser to emit the laser beam at a predetermined frequency and intensity, adjusting the angle of the laser beam with respect to the end of the tube by operating the first motor, adjusting the distance between the laser and the end of the tube by operating the second motor, and rotating the laser drive assembly around the end of the tube by operating the third motor.

According to another embodiment an automated pre-weld tube cleaning system includes a laser drive assembly and a computer system. The laser drive assembly includes a laser configured to emit a laser beam to clean an end of a tube, a first motor configured to change an angle of the laser beam with respect to the end of the tube, a second motor configured to move the laser laterally, and a third motor configured to rotate the laser drive assembly around the end of the tube. The computer system is communicatively coupled to the first motor, the second motor, the third motor, and the laser. The computer system is configured to clean the end of the tube by operating the laser to emit the laser beam, adjusting the angle of the laser beam with respect to the end of the tube by operating the first motor, adjusting the distance between the laser and the end of the tube by operating the second motor, and rotating the laser drive assembly around the end of the tube by operating the third motor.

Technical advantages of certain embodiments may include providing systems and methods of automatically cleaning tube ends prior to welding using laser ablation. Instead of the typical manual processes currently used to clean tube ends prior to welding (e.g., using chemical treatments), the disclosed embodiments quickly and automatically clean tube ends using laser ablation, thereby saving considerable time and expenses. Furthermore, the disclosed embodiments automatically clean tube ends without using dangerous chemical treatments, thereby increasing safety for personnel. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Metal tubes are used in many different vehicles and applications. As one example, metal tubes made of aluminum or titanium are used in aircraft to carry fuel, hydraulic fluid, and electrical cables. Metal tubes are often required to be welded together. In order to ensure proper welds, surface impurities must be removed from the areas where tubes are to be welded. Typically, the weld areas of tubes are often subjected to chemical treatments to remove impurities prior to welding. Such chemical treatments, however, are costly, time-consuming, and hazardous for workers. In addition, pre-weld chemical treatments do not prevent porosity and other defects that can cause welds to fail.

To address these and other problems with preparing metal tubes for welding, the disclosed embodiments provide an automated pre-weld tube cleaning system that uses laser ablation to clean the ends of tubes. The automated pre-weld tube cleaning system consists of a motorized/robotic system that utilizes a three-axis rotating fixture to achieve consistent cleaning coverage on a tube end. As the system rotates and pivots around a stationary tube end that has been captured in a pneumatically actuated capture device, light energy (e.g., from a laser) is used to ablate surface impurities of the tube end without damaging the base material. The system is fully automated and requires little or no input from an operator. As a result, the time required to clean tube ends prior to welding is greatly reduced. Furthermore, by using light as the cleaning medium, the disclosed embodiments do not produce any waste or require any consumables (e.g., cleaning chemicals). This eliminates hazardous exposure to chemicals of typical tube cleaning systems.

To facilitate a better understanding of the present disclosure, the following examples of certain embodiments are given. In no way should the following examples be read to limit or define the scope of the disclosure. Embodiments of the present disclosure and its advantages may be best understood by referring to the included FIGURES, where like numbers are used to indicate like and corresponding parts.

Figure 1:
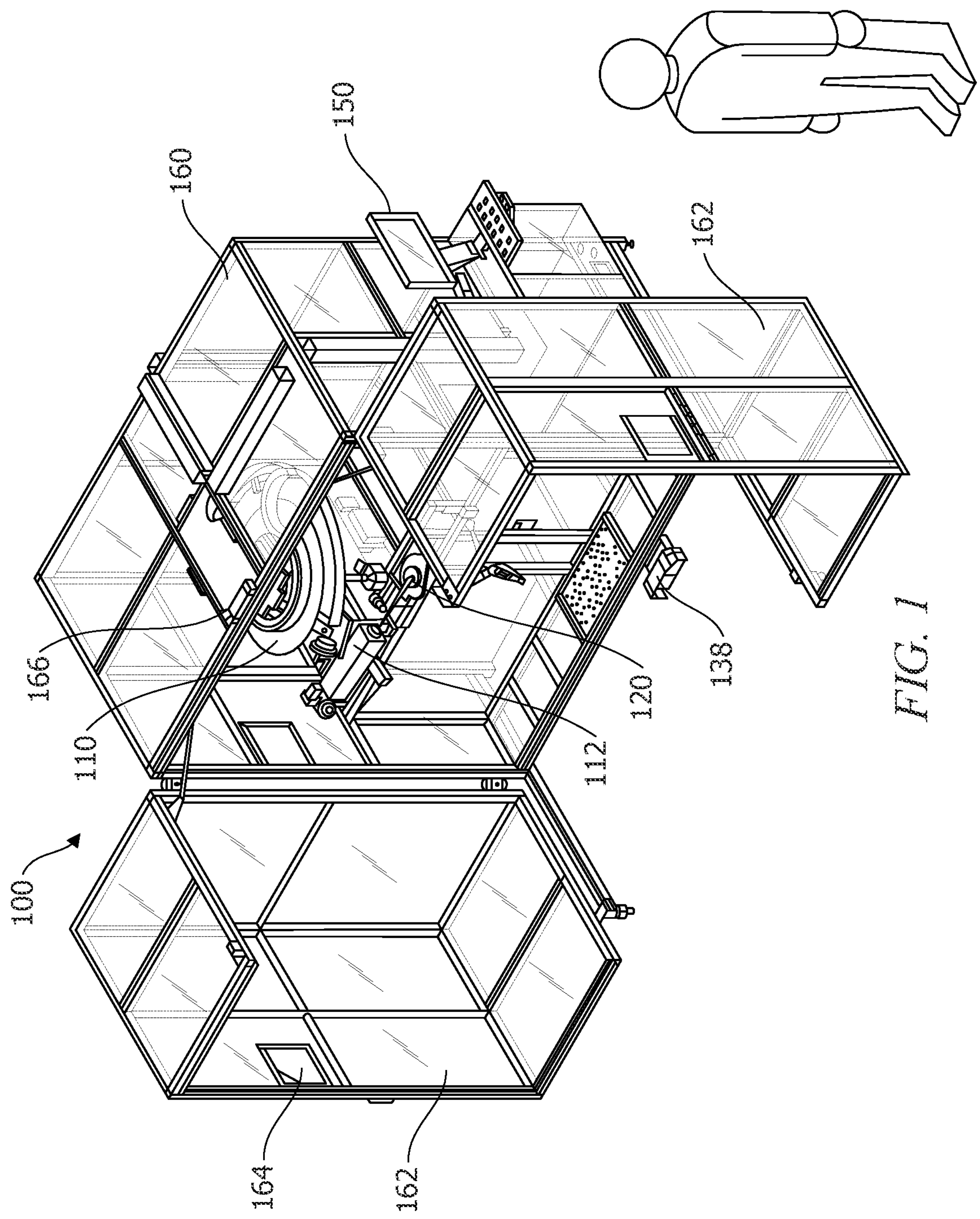
FIG. 1 illustrates an automated pre-weld tube cleaning system, according to certain embodiments.
Figure 2:
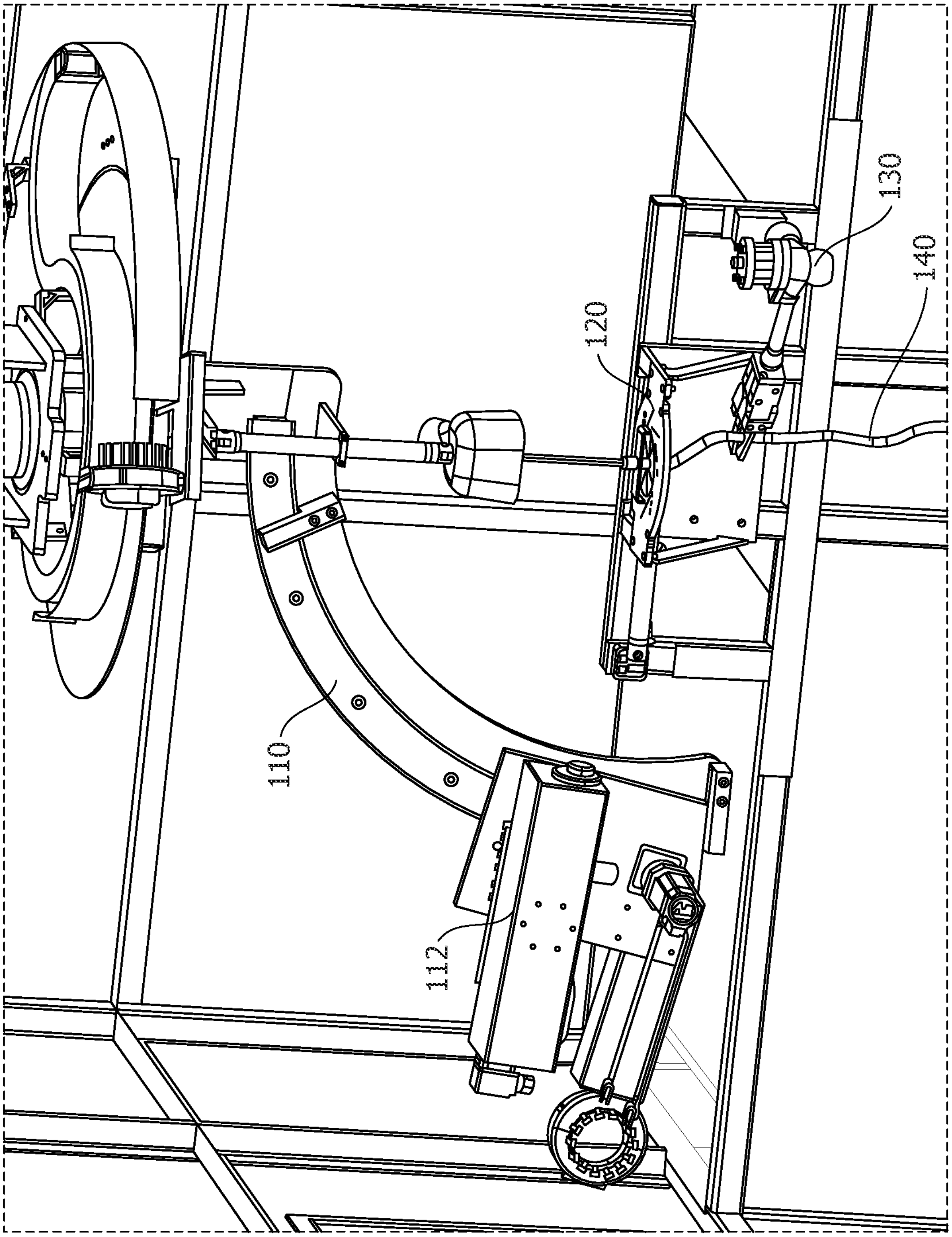
FIG. 2 illustrates a close-up view of the automated pre-weld tube cleaning system of FIG. 1, according to certain embodiments.

FIG. 1 illustrates an automated pre-weld tube cleaning system 100 and FIG. 2 illustrates a close-up view of automated pre-weld tube cleaning system 100, according to certain embodiments. In some embodiments, automated pre-weld tube cleaning system 100 include a laser drive assembly 110, a tube centering assembly 120, a tube support assembly 130, and a computer system 150. In some embodiments, some components of automated pre-weld tube cleaning system 100 (e.g., laser drive assembly 110, tube centering assembly 120, and tube support assembly 130) are enclosed within an enclosure 160 in order to provide containment of laser energy.

In general, automated pre-weld tube cleaning system 100 uses a laser 112 to clean impurities from an end of a tube 140 prior to welding. A tube 140 to be cleaned may first be placed within tube centering assembly 120 such that a tube end 142 to be cleaned protrudes out of tube centering assembly 120. In some embodiments, tube centering assembly 120 includes an iris clamp 125 for centering tube end 142 within tube centering assembly 120. Tube support assembly 130 may then be operated using foot pedals 138 in order to grasp and support tube 140 at a location below tube centering assembly 120. Next, computer system 150 operates laser drive assembly 110 and laser 112 in order to clean tube end 142 using laser 112, as discussed in more detail below.

Figure 3:
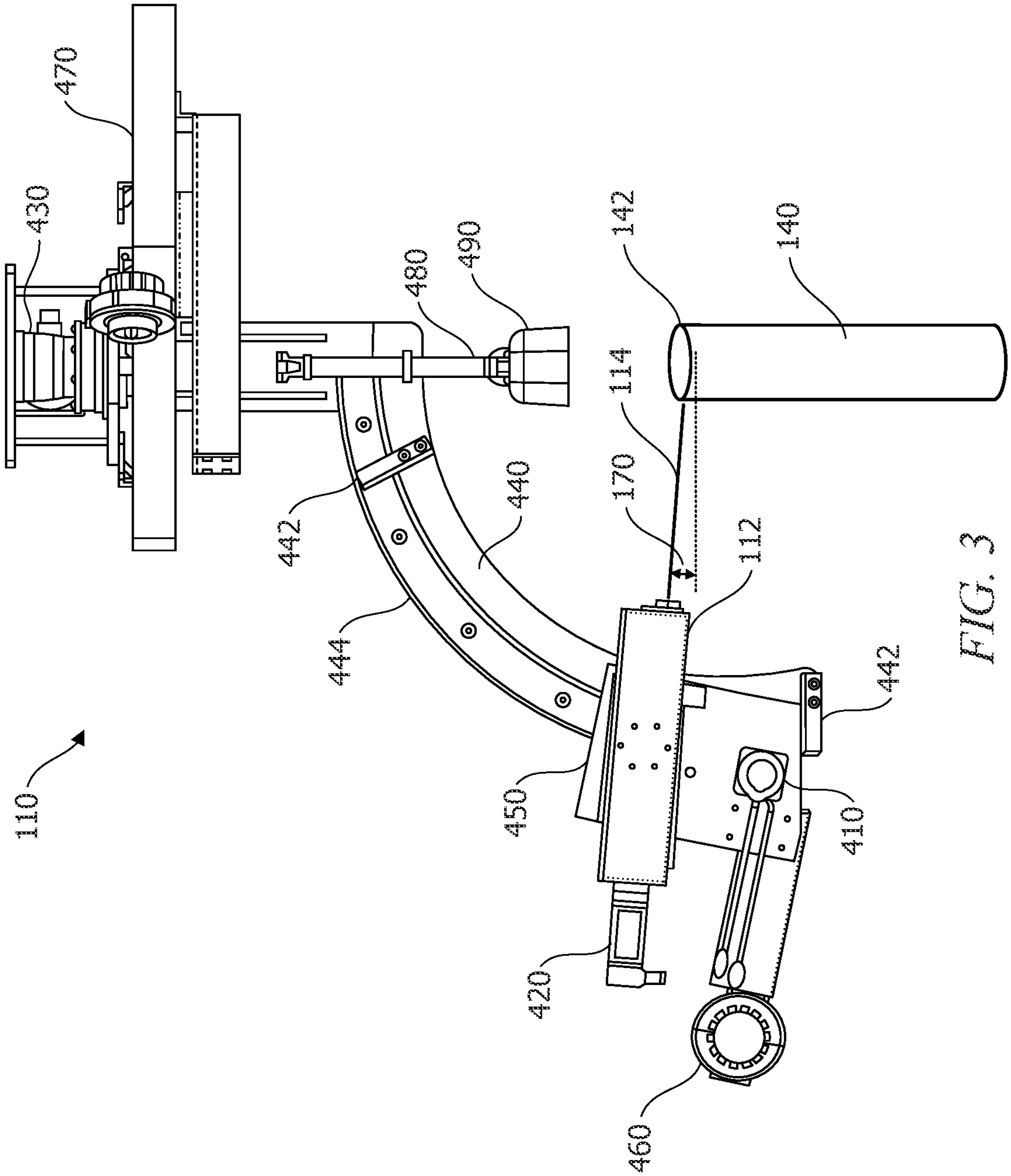
FIG. 3 illustrates a laser drive assembly of the automated pre-weld tube cleaning system of FIG. 1, according to certain embodiments.
Figure 4:
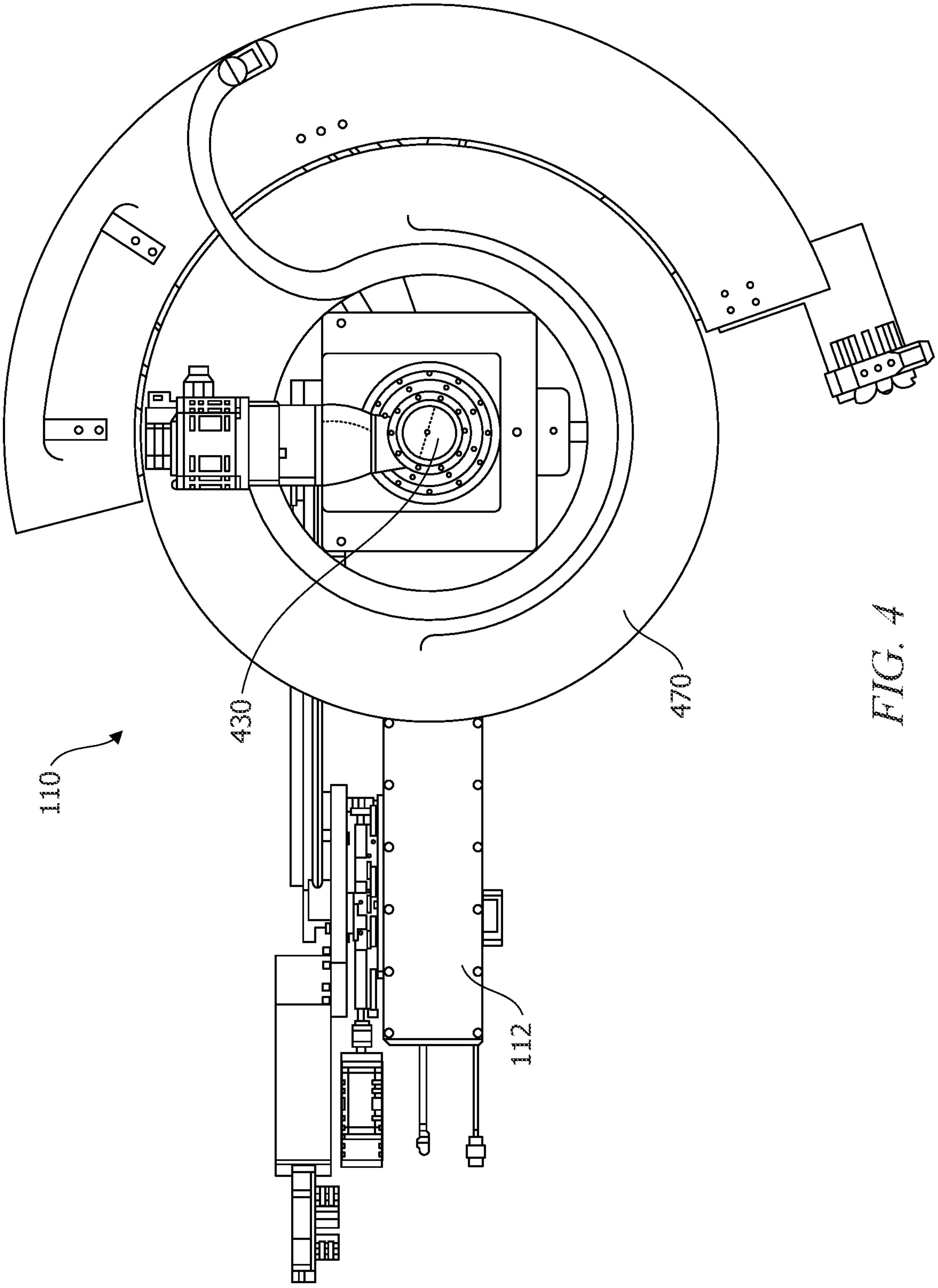
FIG. 4 illustrates a top-down view of the laser drive assembly of FIG. 4, according to certain embodiments.
Figure 5:
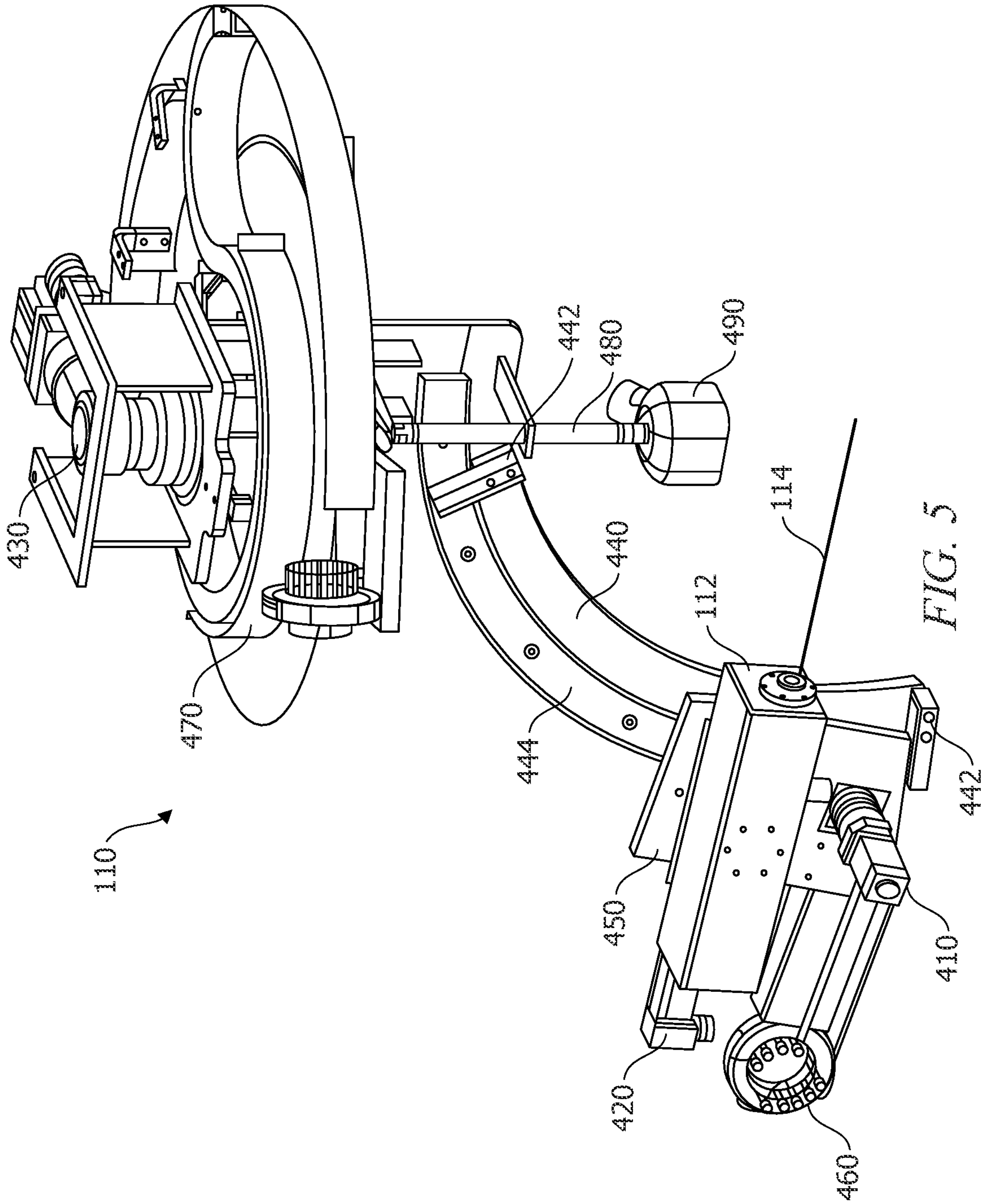
FIG. 5 illustrates a perspective view of the laser drive assembly of FIG. 4, according to certain embodiments.

Laser drive assembly 110 is a three-axis rotating fixture that allows automated pre-weld tube cleaning system 100 to achieve consistent cleaning coverage on tube end 142 using laser 112. A particular embodiment of laser drive assembly 110 is illustrated in FIGS. 3-5. FIG. 3 illustrates a side view of laser drive assembly 110, FIG. 4 illustrates a top-down view of laser drive assembly 110, and FIG. 5 illustrates a perspective view of laser drive assembly 110, according to certain embodiments. In the illustrated embodiments of FIGS. 3-5, laser drive assembly 110 includes an angular drive motor 410, a linear drive motor 420, a rotational drive motor 430, an angular member 440, and a carriage plate 450. Laser 112 is coupled to carriage plate 450, which is slidably coupled to angular member 440 and travels along angular member 440 in order to change an angle 170 of laser beam 114 with respect to tube end 142 (e.g., a smaller angle 170 for cleaning an outside diameter of tube end 142 and a larger angle 170 to clean an inside diameter of tube end 142). In some embodiments, an angular hard stop 442 may be installed at one or both ends of angular member 440 in order to control the travel distance of carriage plate 450 along angular member 440. In some embodiments, carriage plate 450 travels along a ring slide with external gear teeth 444 that is coupled to angular member 440. In general, carriage plate 450 is propelled up and down angular member 440 using angular drive motor 410, which may be an electrical motor that is installed below laser 112 as illustrated. Angular drive motor 410 is communicatively coupled to computer system 150 and is controlled by computer system 150 during cleaning of tube end 142. Angular member 440 may be made from any appropriate material (e.g., metal or plastic) and may have any appropriate arc diameter for cleaning the inside and outside diameters of tube end 142.

Linear drive motor 420 is configured to move laser 112 laterally, thereby changing a distance between laser 112 and tube end 142. This may be used, for example, to change a focal length of laser beam 114 in order to focus on different areas of tube end 142. In some embodiments, linear drive motor 420 is an electrical motor that includes a linear actuator. Linear drive motor 420 is communicatively coupled to computer system 150 and is controlled by computer system 150 during cleaning of tube end 142.

Rotational drive motor 430 is configured to rotate laser drive assembly 110 around tube end 142. This enables laser 112 to clean an entire inner and outer diameter of tube end 142 as laser 112 rotates depending on angle 170 (e.g., a first angle 170 to clean an outside diameter of tube end 142 and a second angle 170 that is larger than the first angle to clean an inside diameter of tube end 142). In some embodiments, rotational drive motor 430 is an electrical motor that is installed above tube end 142 as illustrated. Rotational drive motor 430 is communicatively coupled to computer system 150 and is controlled by computer system 150 during cleaning of tube end 142.

In some embodiments, laser drive assembly 110 includes an angular cable management 460 and a rotary cable management 470. Angular cable management 460 provides management for cables associated with laser 112, angular drive motor 410, and linear drive motor 420 (e.g., electrical cables, communications cables, etc.). Angular cable management 460 may be circular in shape and may be installed at a position below laser 112 as illustrated. Rotary cable management 470 provides management for cables/tubes associated with rotational drive motor 430 and vacuum nozzle 490 (e.g., electrical cables, communications cables, vacuum hoses, etc.). Rotary cable management 470 may be circular in shape and may be installed at a position above tube end 142 as illustrated.

Figure 6:
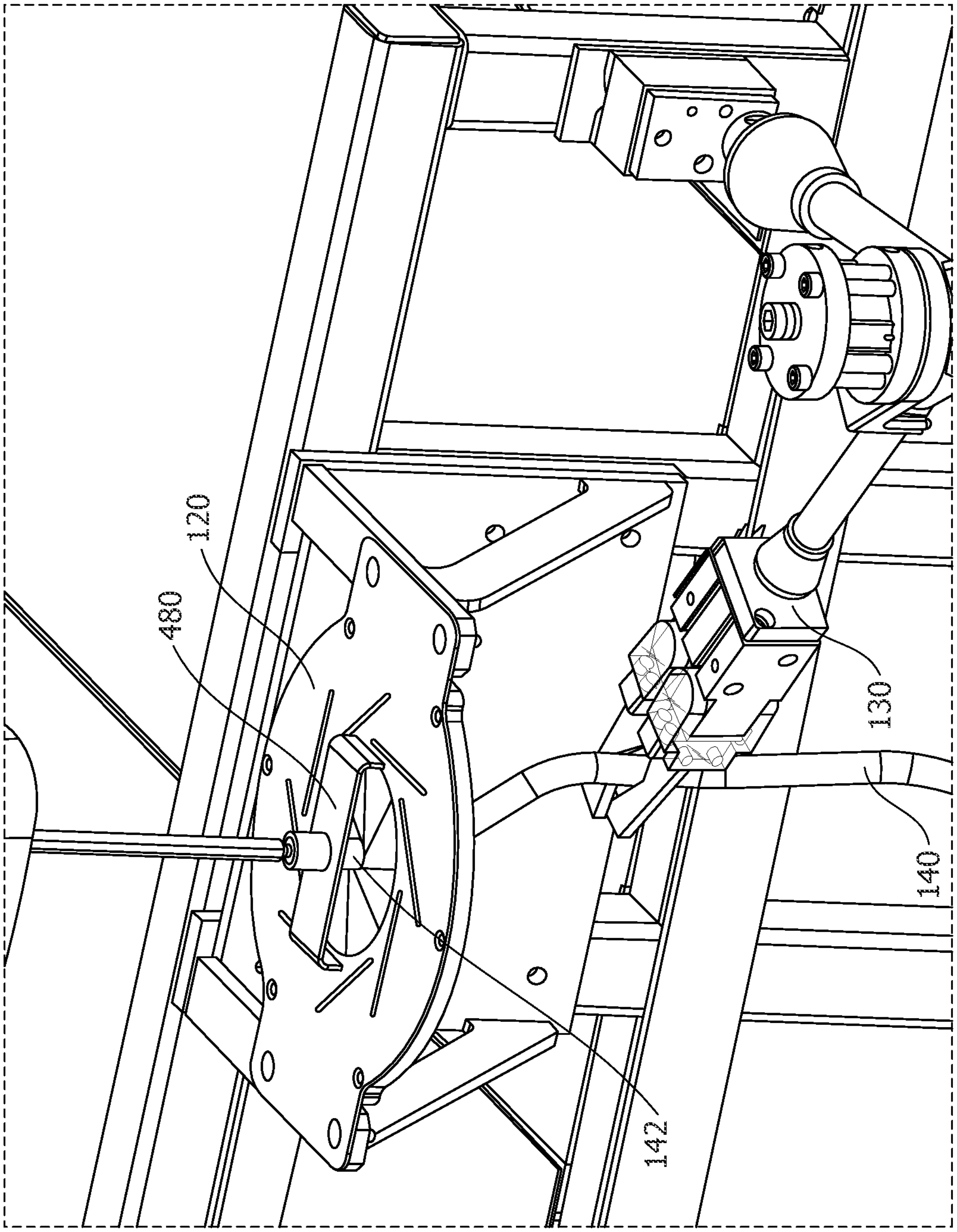
FIG. 6 illustrates a tube centering assembly and a tube support assembly of the automated pre-weld tube cleaning system of FIG. 1, according to certain embodiments.

In some embodiments, laser drive assembly 110 includes a retractable tube hard stop 480. In general, retractable tube hard stop 480 is a device that aligns tube end 142 to a proper orientation and vertical position prior to cleaning. Retractable tube hard stop 480 moves vertically up and down with respect to tube end 142. Any appropriate mechanism may be utilized to extend retractable tube hard stop 480 (e.g., a linear actuator). In some embodiments, retractable tube hard stop 480 may include a rectangular metal plate with edge spacers as illustrated in FIG. 6. The edge spacers enable retractable tube hard stop 480 to contact the surface of tube centering assembly 120 when fully extended but leave a proper vertical distance for tube end 142 to extend above the surface of tube centering assembly 120. When fully extended towards tube centering assembly 120, tube 140 may be placed within tube centering assembly 120 so that tube end 142 contacts retractable tube hard stop 480. Once tube 140 is secured (e.g., using tube centering assembly 120 and tube support assembly 130), retractable tube hard stop 480 may then be retracted up and away from tube end 142 so that tube end 142 may be cleaned by laser 112.

In some embodiments, laser drive assembly 110 includes a vacuum nozzle 490. In some embodiments, vacuum nozzle 490 is a hood that extends down towards tube end 142. Vacuum nozzle 490 is coupled to a vacuum device (not pictured) via a tube or hose. When the vacuum device is operating, fumes and debris (e.g., ablated material) from the cleaning of tube end 142 may be captured by vacuum nozzle 490 and expelled from enclosure 160.

Laser 112 may be any appropriate laser that is communicatively coupled to computer system 150 and is capable of ablating the surface of tube end 142 with laser beam 114. In some embodiments, laser 112 is a near IR (NIR) laser such as a Neodymium laser. In some embodiments, laser 112 is a laser head that is coupled to a laser source that is located off of laser drive assembly 110. In such embodiments, the laser source controls the power and frequency of the laser head (based on laser parameters from computer system 150).

Figure 7A:
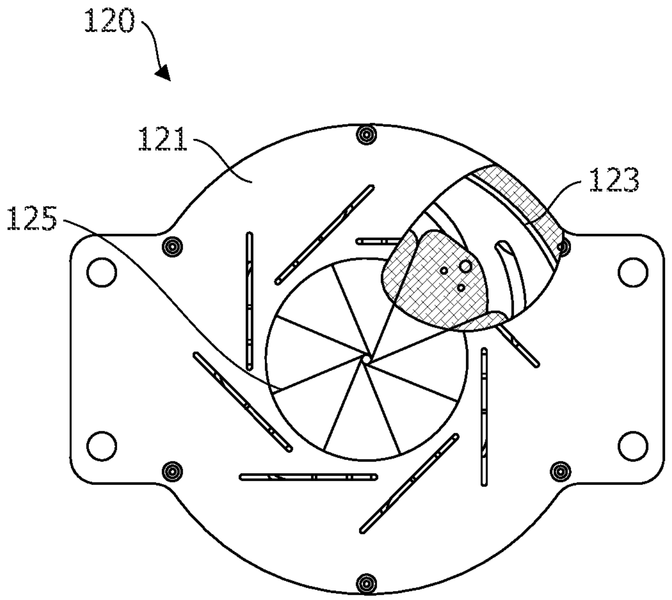
FIG. 7A illustrates a top-down view of the tube centering assembly of FIG. 3, according to certain embodiments.
Figure 7B:
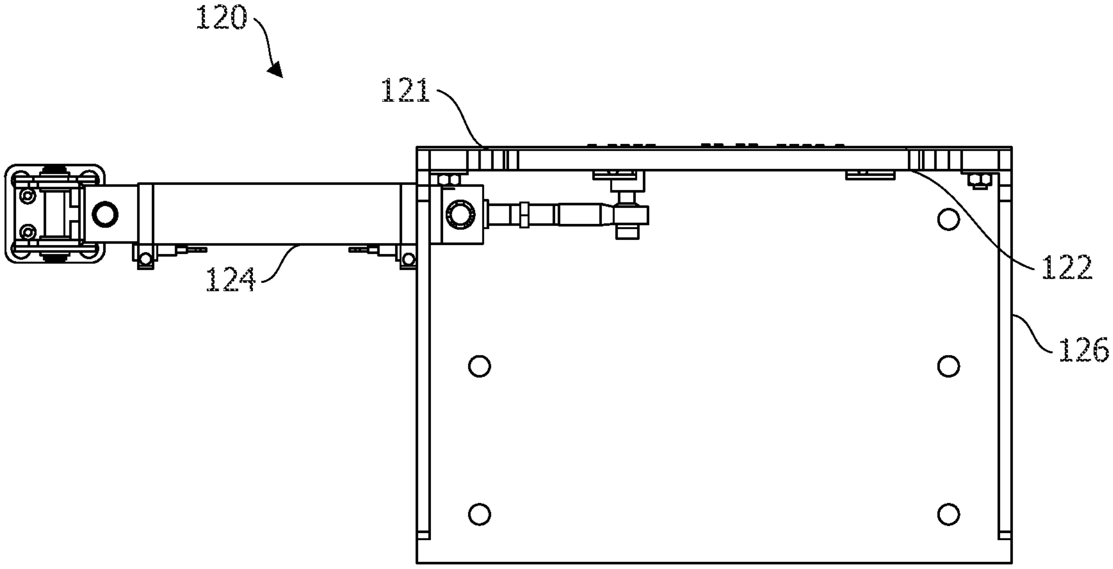
FIG. 7B illustrates a side view of the tube centering assembly of FIG. 3, according to certain embodiments.

With reference to FIGS. 6 and 7A-7B, some embodiments of automated pre-weld tube cleaning system 100 include a tube centering assembly 120. In general, tube centering assembly 120 is configured to support/grasp tube 140 and orient tube 140 at a proper position for cleaning by laser 112. In some embodiments, tube centering assembly 120 includes a top cover 121, a bottom cover 122, a slide plate 123, a clamping cylinder 124, an iris clamp 125, and a mounting bracket 126, as illustrated in FIGS. 7A-7B. In some embodiments, top cover 121 and bottom cover 122 are generally flat and are made of metal or any other suitable material to withstand laser radiation. Slide plate 123 is coupled to clamping cylinder 124 and contains multiple fingers that form iris clamp 125. When operated by clamping cylinder 124, slide plate 123 rotates, thereby sliding the fingers of iris clamp 125 along grooves in top cover 121. This closes or opens iris clamp 125 in order to secure or release tube 140. In some embodiments, clamping cylinder 124 (and therefore iris clamp 125) is operated manually using a foot pedal 138.

Figure 8:
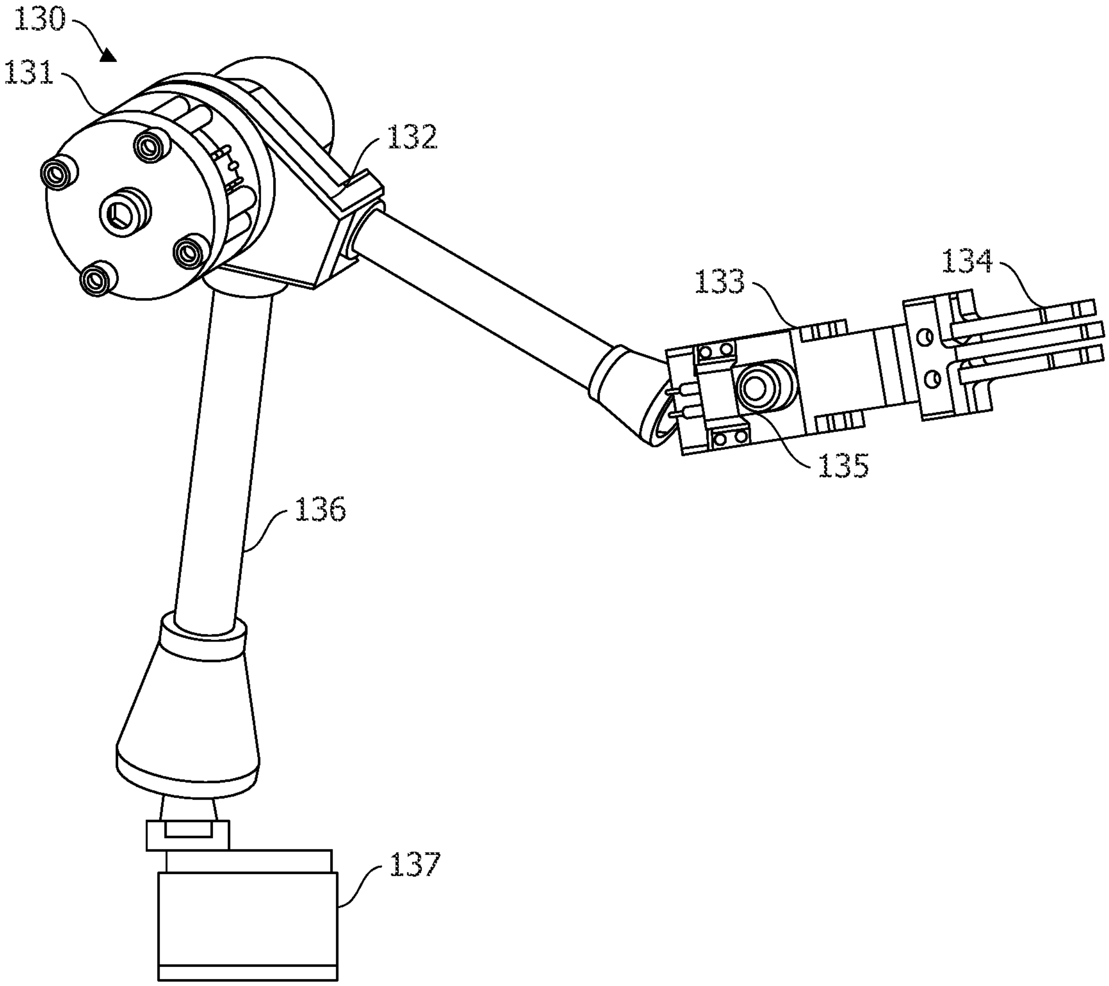
FIG. 8 illustrates a perspective view of the tube support assembly of FIG. 3, according to certain embodiments.

With reference to FIGS. 6 and 8, some embodiments of automated pre-weld tube cleaning system 100 include a tube support assembly 130. In general, tube support assembly 130 is configured to grasp tube 140 at a position below iris clamp 125 of tube centering assembly 120, thereby supporting and securing tube 140 during cleaning. In some embodiments, tube support assembly 130 includes a pneumatic cylinder 131, a mounting bracket 132, a pneumatic gripper 133 with fingers 134, a gripper control switch 135, a articulated arm 136, and a magnetic base 137. In some embodiments, tube support assembly 130 is operated manually using a foot pedal 138. In some embodiments, tube support assembly 130 operation consists of operating a foot pedal 138 to actuate the iris clamp 125 open, allowing for placement of the tube 140. The tube is inserted from below into the iris clamp 125 and placed against the vertical hard stop 480 such that tube edge 142 contacts tube hard stop 480.

The iris clamp foot pedal 138 is released and the iris is actuated closed around the tube 140, centering the tube such that it is concentric with the path of laser 112 path around the tube 140. In some embodiments, an adjacent pedal 138 may be actuated, releasing pressure from a clamping cylinder in the tube support assembly 130 to allow for articulation as it is then maneuvered to the non-affected tube area below the iris clamp 125 to increase stability. A gripper control switch 135 may be pressed which actuates the pneumatic gripper 133 to open fingers 134. The tube support assembly 130 is placed such that the fingers 314 grasp the non-affected area of the tube 140 as gripper control switch 135 is released, actuating closed the fingers 134. The adjacent tube support assembly foot pedal 138 may be released, actuating the clamping cylinder 131 to freeze the tube support assembly 130 in place, securing the tube 140 in all relevant dimensions.

Tube 140 is any tube of any shape, length, diameter, thickness, and material. In some embodiments, tube 140 is a metal tube that has a tube end 142. In general, tube end 142 is an end of tube 140 that is to be cleaned prior to welding.

Computer system 150 is communicatively coupled to components of automated pre-weld tube cleaning system 100 (e.g., one or more of angular drive motor 410, linear drive motor 420, rotational drive motor 430, laser 112, retractable tube hard stop 480, and vacuum nozzle 490). Computer system 150 controls the operations of automated pre-weld tube cleaning system 100 in order to clean tube end 142 of tube 140 using laser 112, as described herein. For example, computer system 150 operates laser 112 to emit laser beam 114 at a predetermined frequency and intensity, adjusts angle 170 of laser beam 114 with respect to tube end 142 by operating angular drive motor 410, adjusts the distance between laser 112 and tube end 142 by operating linear drive motor 420, and rotates laser drive assembly 110 around tube end 142 by operating rotational drive motor 430. A particular embodiment of computer system 150 is illustrated and described in reference to FIG. 13.

Enclosure 160 is any room or structure for housing one or more components of automated pre-weld tube cleaning system 100 (e.g., laser drive assembly 110, tube centering assembly 120, and tube support assembly 130). In some embodiments, enclosure 160 includes one or more laser safety windows 164 that allow an operator to view the operation of automated pre-weld tube cleaning system 100 from outside enclosure 160 but prevents laser radiation generated by laser 112 from escaping enclosure 160. In some embodiments, computer system 150 is located outside enclosure 160 as illustrated in FIG. 1. In some embodiments, enclosure 160 includes one or more doors 162 and one or more electromagnetic locks 166 configured to electronically hold the one or more doors 162 closed during operation of automated pre-weld tube cleaning system 100.

Figure 9:
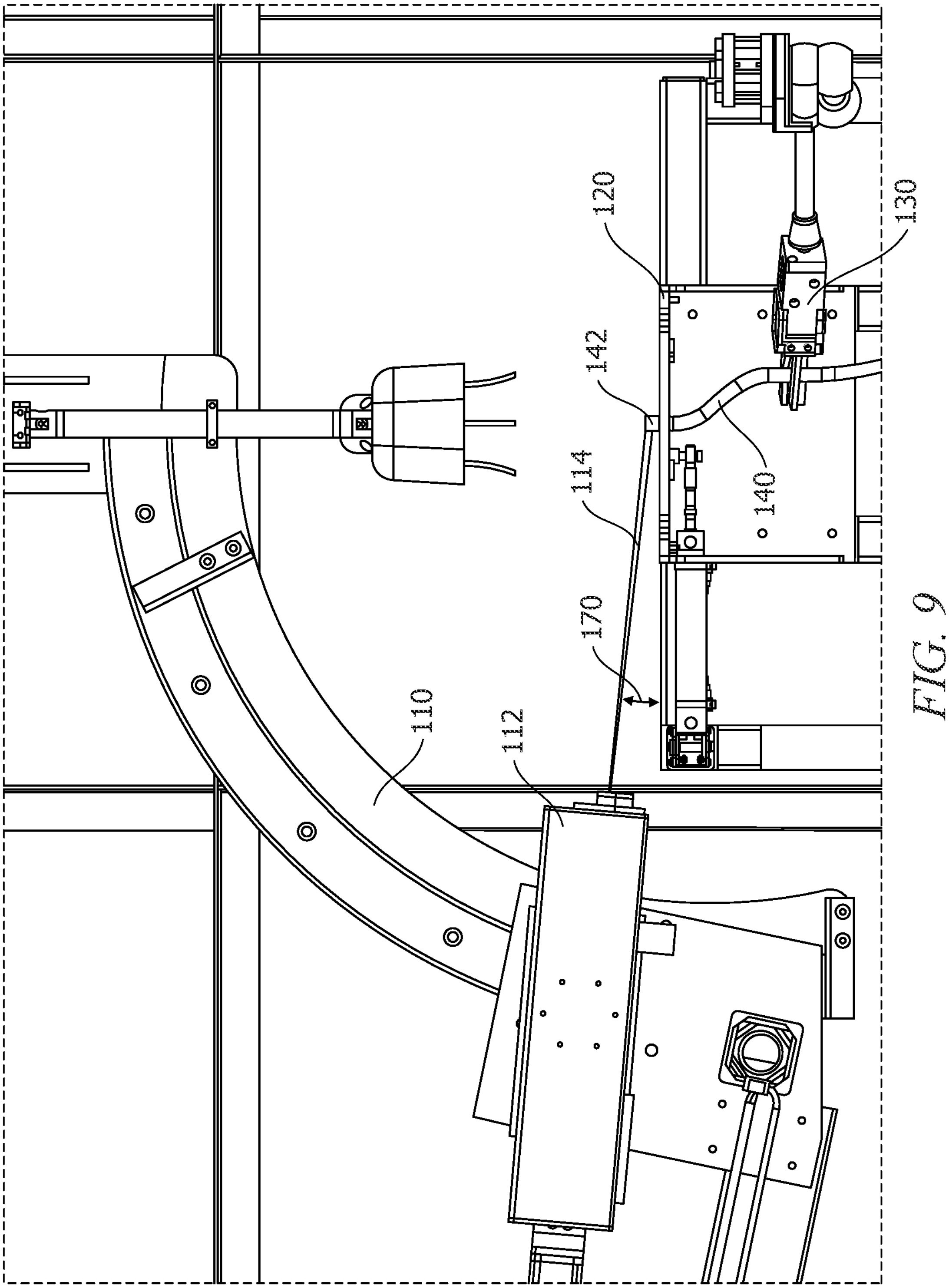
FIGS. 9-10 illustrate the automated pre-weld tube cleaning system of FIG. 1 cleaning an outside diameter of a tube end, according to certain embodiments.
Figure 10:
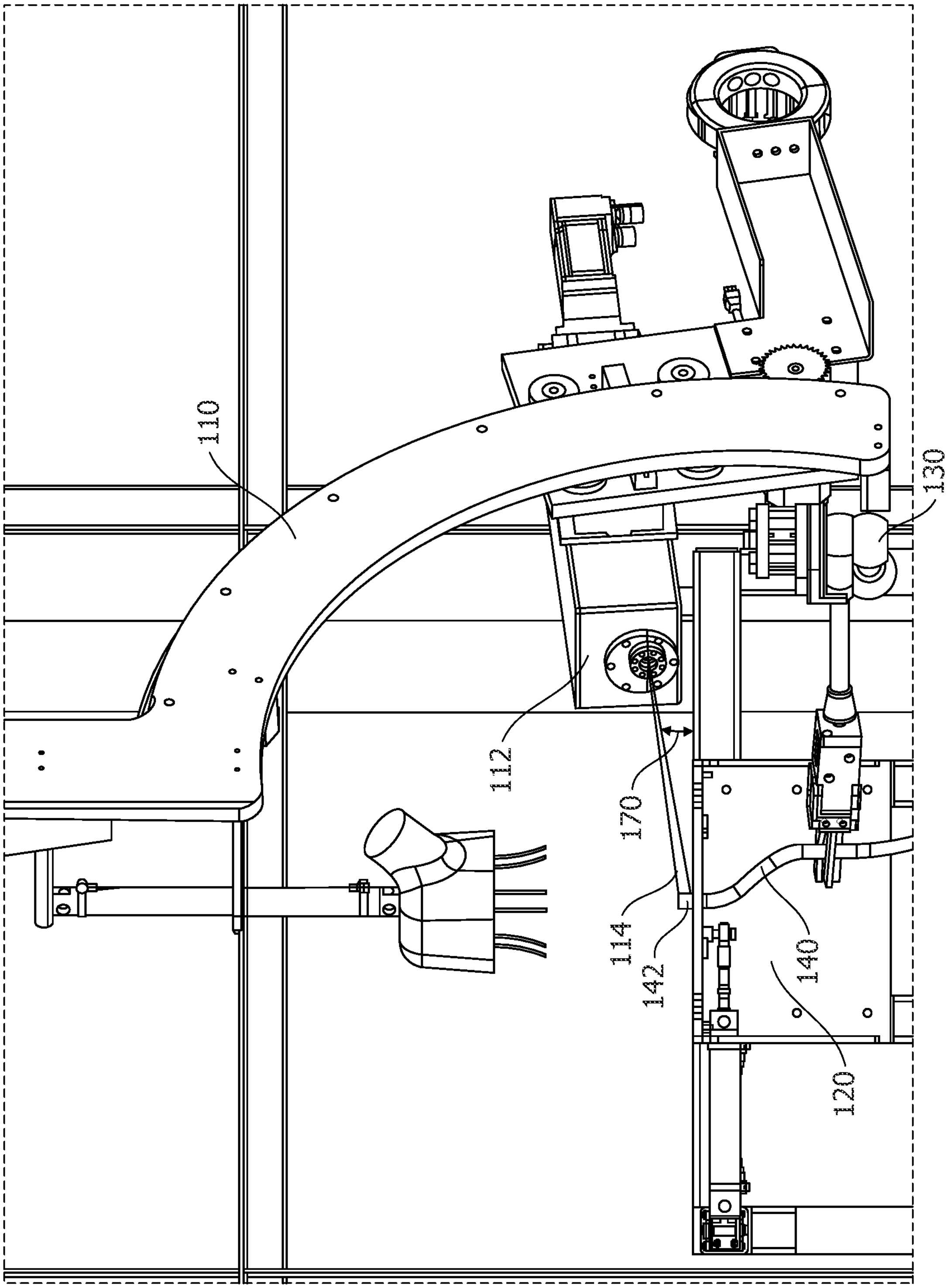
Figure 11:
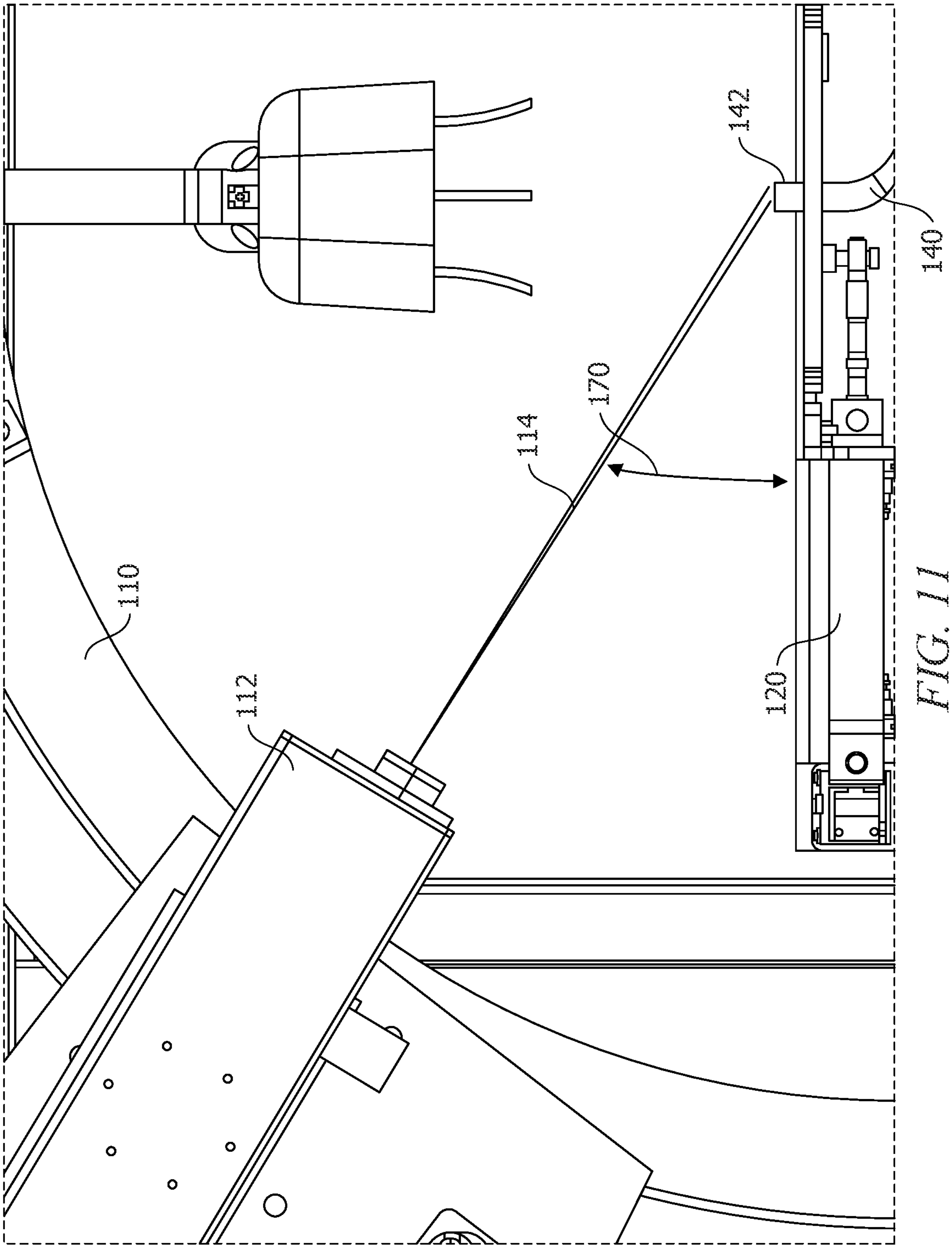
FIG. 11 illustrates the automated pre-weld tube cleaning system of FIG. 1 cleaning an inside diameter of a tube end, according to certain embodiments.

In operation, and in reference to FIGS. 9-11, automated pre-weld tube cleaning system 100 cleans tube end 142 of tube 140 using laser 112. To do so, computer system 150 controls/operates various components of automated pre-weld tube cleaning system 100 in order to rotate laser 112 about tube end 142. For example, computer system 150 may first adjust angle 170 of laser beam 114 with respect to tube end 142 by operating angular drive motor 410. As a specific example, computer system 150 may send one or more commands to angular drive motor 410 to adjust laser beam 114 to a first angle 170 as illustrated in FIG. 9. This angle 170 may be at an angle that allows laser beam 114 to contact and clean an outside diameter of tube end 142. Next, computer system 150 may send one or more commands to linear drive motor 420 in order to operate linear drive motor 420 and therefore adjust a distance between laser 112 and tube end 142. This may control the intensity or focal point of laser beam 114 on tube end 142. Next, computer system 150 may send one or more commands to rotational drive motor 430 in order to rotate laser drive assembly 110 around tube end 142. For example, as illustrated in FIG. 10, rotational drive motor 430 may be operated to rotate laser drive assembly 110 clock-wise around tube end 142 so that the entire outside diameter of tube end 142 is cleaned by laser beam 114. Once complete, computer system 150 may send one or more commands to angular drive motor 410 to adjust laser beam 114 to a second angle 170 as illustrated in FIG. 11. This angle 170 may be greater than angle 170 of FIG. 9 and may be an angle that allows laser beam 114 to contact and clean an inside diameter of tube end 142. Next, computer system 150 may send one or more commands to rotational drive motor 430 in order to rotate laser drive assembly 110 around tube end 142 at the second angle 170. For example, rotational drive motor 430 may be operated to rotate laser drive assembly 110 counterclockwise motion around tube end 142 so that the entire inside diameter of tube end 142 is cleaned by laser beam 114.

Figure 12:
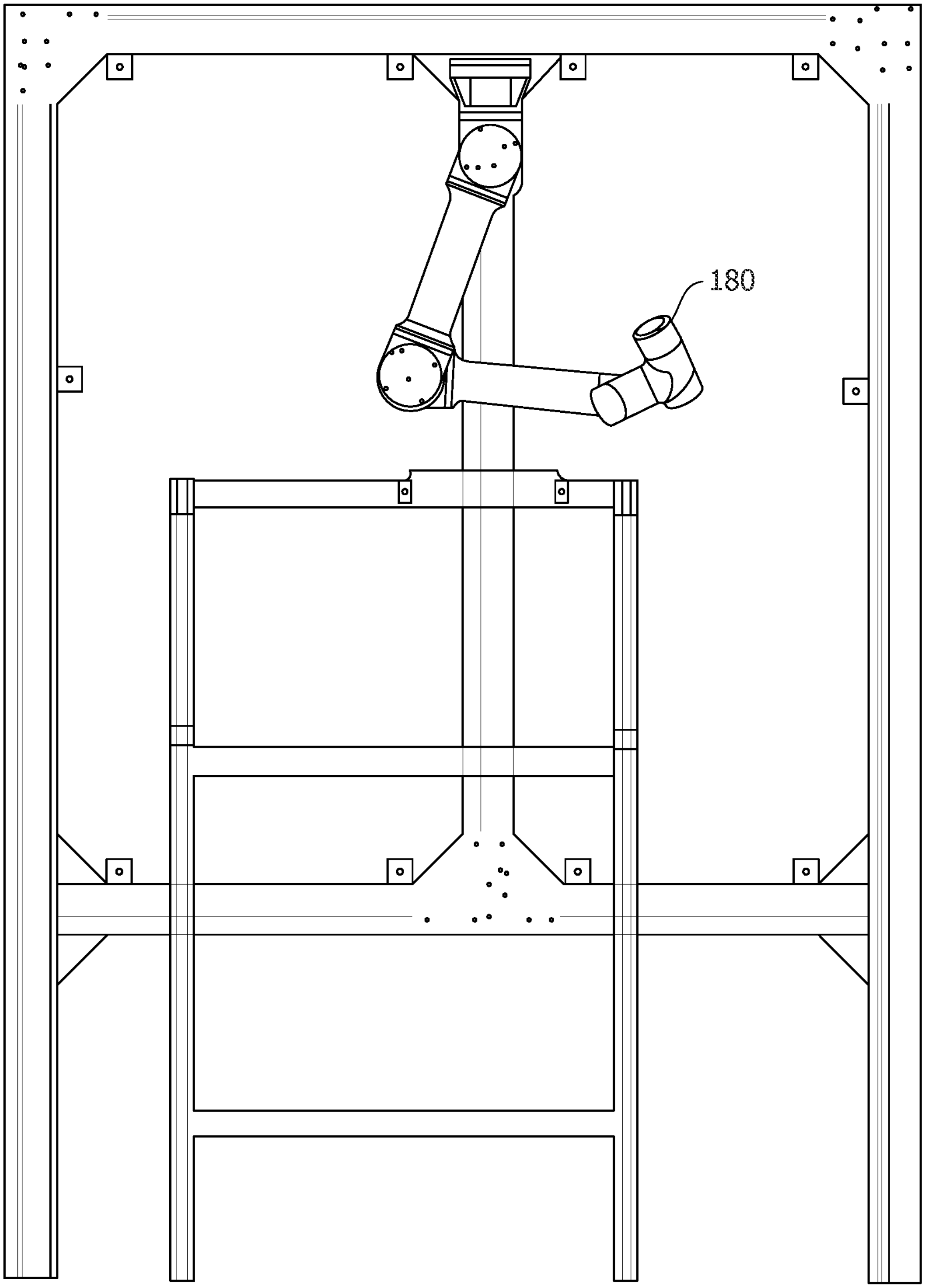
FIG. 12 illustrates an automated pre-weld tube cleaning system that utilizes a robotic arm, according to certain embodiments.

In some embodiments, laser drive assembly 110 may be replaced by robotic arm 180 as illustrated in FIG. 12. In these embodiments, robotic arm 180 is any appropriate articulating robotic arm system that is capable of positioning laser 112 any programmed angle and distance from tube end 142. In general, robotic arm 180 is controlled by computer system 150 in order to clean tube end 142 as described above.

Figure 13:
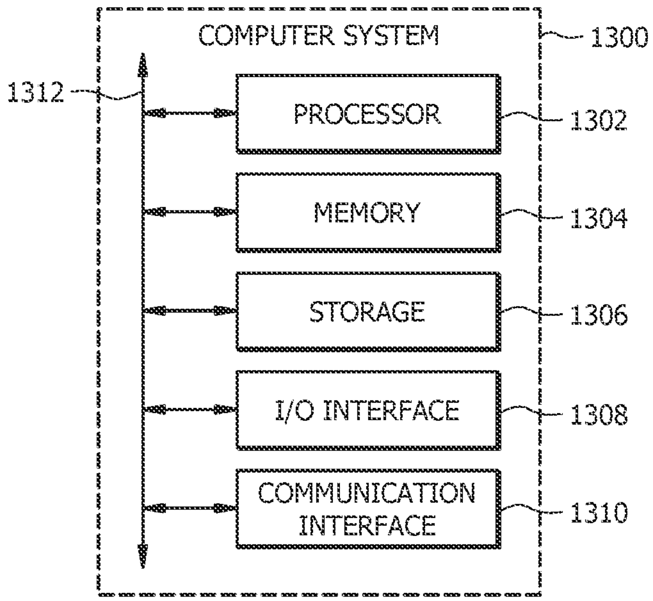
FIG. 13 is an example computer system that can be utilized to implement aspects of the various technologies presented herein, according to particular embodiments.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, wireless communications) between computer system 1300 and one or more other devices or system. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Although several embodiments have been illustrated and described in detail, it will be recognized that substitutions and alterations are possible without departing from the spirit and scope of the present disclosure, as defined by the appended claims.

What is claimed is:

1. An automated pre-weld tube cleaning system comprising:
- a laser drive assembly comprising:
  - an angular member;
  - a carriage plate slidably coupled to the angular member;
  - a laser coupled to the carriage plate, the laser configured to emit a laser beam to clean an end of a tube;
  - a first motor configured to move the carriage plate and laser along the angular member, thereby changing an angle of the laser beam with respect to the end of the tube;
  - a second motor configured to move the laser laterally, thereby changing a distance between the laser and the end of the tube; and
  - a third motor configured to rotate the laser drive assembly around the end of the tube;
- a tube centering assembly comprising an iris clamp configured to orient the tube;
- a tube support assembly configured to grasp the tube at a position below the iris clamp; and
- a computer system communicatively coupled to the first motor, the second motor, the third motor, and the laser, the computer system configured to clean the end of the tube by:
  - operating the laser to emit the laser beam at a predetermined frequency and intensity;
  - adjusting the angle of the laser beam with respect to the end of the tube by operating the first motor;
  - adjusting the distance between the laser and the end of the tube by operating the second motor; and
  - rotating the laser drive assembly around the end of the tube by operating the third motor.

2. The automated pre-weld tube cleaning system of claim 1, wherein the laser drive assembly further comprises a retractable tube hard stop configured to:
- move vertically with respect to the end of the tube; and
- provide control over a vertical position of the end of the tube.

3. The automated pre-weld tube cleaning system of claim 1, wherein the laser drive assembly further comprises a vacuum nozzle coupled to a vacuum and operable to capture ablated material and fumes created during the cleaning of the end of the tube.

4. The automated pre-weld tube cleaning system of claim 1, further comprising an enclosure surrounding the laser drive assembly, the tube centering assembly, and the tube support assembly.

5. The automated pre-weld tube cleaning system of claim 4, wherein the enclosure comprises:

a laser safety window;

one or more doors; and one or more electromagnetic locks configured to hold the one or more doors closed during cleaning of the end of the tube.

6. The automated pre-weld tube cleaning system of claim 1, wherein the carriage plate is slidably coupled to the angular member with a ring slide comprising a plurality of gear teeth.

7. The automated pre-weld tube cleaning system of claim 1, wherein the second motor comprises a linear actuator.

8. The automated pre-weld tube cleaning system of claim 1, wherein adjusting the angle of the laser beam with respect to the end of the tube comprises utilizing two angles, the two angles comprising:

a first angle to clean an outside diameter of the end of the tube; and a second angle to clean an inside diameter of the end of the tube.

9. An automated pre-weld tube cleaning system comprising:

a laser drive assembly comprising:

a laser configured to emit a laser beam to clean an end of a tube;

a first motor configured to change an angle of the laser beam with respect to the end of the tube;

a second motor configured to move the laser laterally, thereby changing a distance between the laser and the end of the tube; and a third motor configured to rotate the laser drive assembly around the end of the tube; and a computer system communicatively coupled to the first motor, the second motor, the third motor, and the laser, the computer system configured to clean the end of the tube by:

operating the laser to emit the laser beam;

adjusting the angle of the laser beam with respect to the end of the tube by operating the first motor;

adjusting the distance between the laser and the end of the tube by operating the second motor; and rotating the laser drive assembly around the end of the tube by operating the third motor.

10. The automated pre-weld tube cleaning system of claim 9, wherein the laser drive assembly further comprises a retractable tube hard stop configured to:

move vertically with respect to the end of the tube; and provide control over a vertical position of the end of the tube.

11. The automated pre-weld tube cleaning system of claim 9, wherein the laser drive assembly further comprises a vacuum nozzle coupled to a vacuum and operable to capture ablated material and fumes created during the cleaning of the end of the tube.

12. The automated pre-weld tube cleaning system of claim 9, further comprising an enclosure surrounding the laser drive assembly.

13. The automated pre-weld tube cleaning system of claim 12, wherein the enclosure comprises:

a laser safety window;

one or more doors; and one or more electromagnetic locks configured to hold the one or more doors closed during cleaning of the end of the tube.

14. The automated pre-weld tube cleaning system of claim 9, wherein the second motor comprises a linear actuator.

15. The automated pre-weld tube cleaning system of claim 9, wherein adjusting the angle of the laser beam with respect to the end of the tube comprises utilizing two angles, the two angles comprising:

a first angle to clean an outside diameter of the end of the tube; and a second angle to clean an inside diameter of the end of the tube.

16. An automated pre-weld tube cleaning system comprising:

a laser configured to emit a laser beam to clean an end of a tube;

a robotic arm configured to:

change an angle of the laser beam with respect to the end of the tube;

change a distance between the laser and the end of the tube; and rotate the laser drive assembly around the end of the tube; and a computer system communicatively coupled to the robotic arm and the laser, the computer system configured to clean the end of the tube by:

operating the laser to emit the laser beam;

adjusting the angle of the laser beam with respect to the end of the tube by operating the robotic arm;

adjusting the distance between the laser and the end of the tube by operating the robotic arm; and rotating the laser drive assembly around the end of the tube by operating the robotic arm.

17. The automated pre-weld tube cleaning system of claim 16, further comprising an enclosure surrounding the robotic arm.

18. The automated pre-weld tube cleaning system of claim 16, wherein the enclosure comprises:

a laser safety window;

one or more doors; and one or more electromagnetic locks configured to hold the one or more doors closed during cleaning of the end of the tube.

19. The automated pre-weld tube cleaning system of claim 16, wherein adjusting the angle of the laser beam with respect to the end of the tube comprises utilizing two angles, the two angles comprising:

a first angle to clean an outside diameter of the end of the tube; and a second angle to clean an inside diameter of the end of the tube.

20. The automated pre-weld tube cleaning system of claim 16, wherein the robotic arm is mounted vertically above the end of the tube.

* * * * *